United States Patent

Srivastava et al.

[15] 3,656,149

[45] Apr. 11, 1972

[54] THREE FREQUENCY DATA SEPARATOR

[72] Inventors: Keshava Srivastava, Waltham; Samuel J. Dixon, Hollist, both of Mass.

[73] Assignee: Honeywell Information Systems Inc., Waltham, Mass.

[22] Filed: Nov. 23, 1970

[21] Appl. No.: 91,626

[52] U.S. Cl. ..................340/347 DD, 328/119, 340/174.1 H

[51] Int. Cl. ........................................H04l 3/00, H03r 13/24

[58] Field of Search .................340/347 DD, 174.1, 174.1 G, 340/174.1 H; 178/66, 67, 68; 325/38; 328/55, 63, 119

[56] References Cited

UNITED STATES PATENTS

| | | | |
|---|---|---|---|
| 3,264,623 | 8/1966 | Gabor | 340/174.1 |
| 3,374,475 | 3/1968 | Gabor | 340/174.1 |
| 3,414,894 | 12/1968 | Jacoby | 340/347 DD |
| 3,452,348 | 6/1969 | Vallee | 340/347 DD |
| 3,500,385 | 3/1970 | Padalino et al | 340/347 DD |
| 3,491,303 | 1/1970 | Gindi | 328/119 |
| 3,114,899 | 12/1963 | Gabor | 340/174.1 |

*Primary Examiner*—Thomas A. Robinson
*Attorney*—Ronald T. Reiling and Fred Jacob

[57] ABSTRACT

A three frequency data separator is disclosed. Information which has been recorded on a magnetic storage medium using a three frequency recording technique is decoded by utilizing a phase-locked loop which generates signals at twice the data rate. A preamble existing in the machine and the phase-locked clock are used to generate a "window" in the middle of a cell. The "window" is checked to determine if there is a phase reversal in the middle of the cell; such a phase reversal indicates a ONE whereas the absence of a reversal indicates a ZERO.

16 Claims, 3 Drawing Figures

INVENTORS
KESHAVA SRIVASTAVA
SAMUEL J. DIXON
BY Nicholas Prasinos
ATTORNEY

INVENTORS
KESHAVA SRIVASTAVA
SAMUEL J. DIXON
BY
ATTORNEY

INVENTORS
KESHAVA SRIVASTAVA
SAMUEL J. DIXON
BY Nicholas Prasinos
ATTORNEY

THREE FREQUENCY DATA SEPARATOR

BACKGROUND OF THE INVENTION

1. Field Of The Invention

This invention relates to digital decoding systems and more particularly decoding systems for use in magnetic recordings utilizing the three frequency code.

2. Discussion Of The Prior Art

Three frequency recording is a recording scheme in which magnetic flux reversals are placed in the center of bit cells containing a ONE value of binary data and flux reversals are placed between binary bit cells containing ZERO values of binary data. (A bit cell is herein defined as one length along an information track allocated to storing a binary digit; a bit cell may also be regarded as a time period as the track moves beneath the recording head). The rules for three frequency encoding are:

1. a flux reversal is made to occur in the center of every bit cell containing a binary ONE; and,
2. a flux reversal is made to occur between two adjacent bit cells containing binary ZEROS.

Prior art decoder systems for three frequency encoded data falls into two broad categories:

a. interval detection wherein there is peak-to-peak detection and the time between peaks is measured; and,
b. cell-strobe detection wherein a "window" is established during the cell interval to determine if there is a ONE in the middle of the cell.

The latter technique is somewhat technically easier to implement because it is not necessary to measure extremely small intervals of times.

Prior art three frequency decoders are to be found in the U.S. Pats. of J. A. Vallee No. 3,452,348 and G. V. Jacoby No. 3, 414,894. In J. A. Vallee, "a timing extraction circuit generates a first timing wave having a pulse during the first half of each bit cell, and the second timing wave having a pulse during the second half of each bit cell. The timing waves are used to effect a comparison of the first and second halves of each input signal bit cell. If different, the output NRZ-coded bit is a 'ONE' and if they are the same, the output NRZ-coded bit is a 'ZERO'." (Column 1, lines 15 to 22) In G. V. Jacoby, "the reproduced self-clocking information signal is delayed about 1½ of a bit cell. Means enabled by pulses of the timing wave compares the second half of each reproduced information signal bit cell with the delayed information-indicating pulse wave, and provides a 'same' output when they are the same, and a 'different' output when they are different." These prior art devices utilize too many fixed delays which can introduce inaccuracies at several places and in Jacoby, cited above, for example, the disclosed device requires delays in the order of quarter bit, half bit, three-quarters bit, etc. In such a system, because the magnetic medium being read, such as a disk, suffers from variations in speed, fixed delays can cause problems—particularly at high densities. In order to eliminate such difficulties, error detecting circuitry is generally incorporated into the apparatus, thus further complicating the device and adding to the cost of manufacture.

OBJECTS

Accordingly, it is an object of this invention to provide an improved decoder system for decoding three frequency codes.

It is a more specific object of the invention to provide a decoder system for converting a three frequency encoded signal to Non-Return-To-Zero (NRZ) signal and a clock pulse wave.

It is still a further specific object of the invention to provide a decoder system which utilizes a minimum number of time delays.

It is still another more specific object of the invention to provide a decoder system wherein the time delays are not critical in the circuit.

It is yet another more specific object of the invention to provide an improved decoder system that can be manufactured at low cost.

SUMMARY OF THE INVENTION

The invention utilizes a conventional phase-locked loop whose center frequency is set at twice the data rate. A synchronous "window" is established in the middle of the cell by utilizing the initial preamble (hereinafter defined on page 12, line 19) of all ONES and a phase-locked loop output. Two time delays are used to finally adjust, or fine tune, the relationship between pulse peaks and "window;" one of the time delays is used for initial synchronization, whereas the second time delay is used to adjust the relationship between peaks and windows. The phase-locked loop (PLL) clock output and the peaks are synchronized such that the trailing edge of the PLL clock coincides with the leading edge of the peaks. A clock sync pulse is generated by using the index pulse and a one-shot to give a signal when clock is in lock. When this condition occurs, a first flip-flop will not further receive peak pulses, and regular PLL clock pulses will toggle the first flip-flop providing window pulses at the center of the cell. A second flip-flop provides peak pulses which occur when the "window" is high. The second flip-flop is reset by a timing signal generated by the first flip-flop and an intermediate flip-flop providing pulses which are delayed by half a clock cycle from the first flip-flop cycles. The pulses from the second flip-flop are gated into a third flip-flop to provide NRZ DATA out. A fourth flip-flop acting as a gate is enabled when NRZ DATA-out goes to low from high for the first time, which also permits the data clock to go out.

The above and other objects of the invention are achieved in an illustrative embodiment described hereinafter. All features which are believed to be characteristic of the invention, both as to its organization and method of operation together with further objects and advantages thereof will be better understood from the following description considered in connection with the accompanying drawings. It is to be expressly understood, however, these drawings are for the purpose of illustration and description only and are not intended as a definition of the limits of the invention.

DESCRIPTION OF THE PREFERRED EMBODIMENT

Figure 1A:
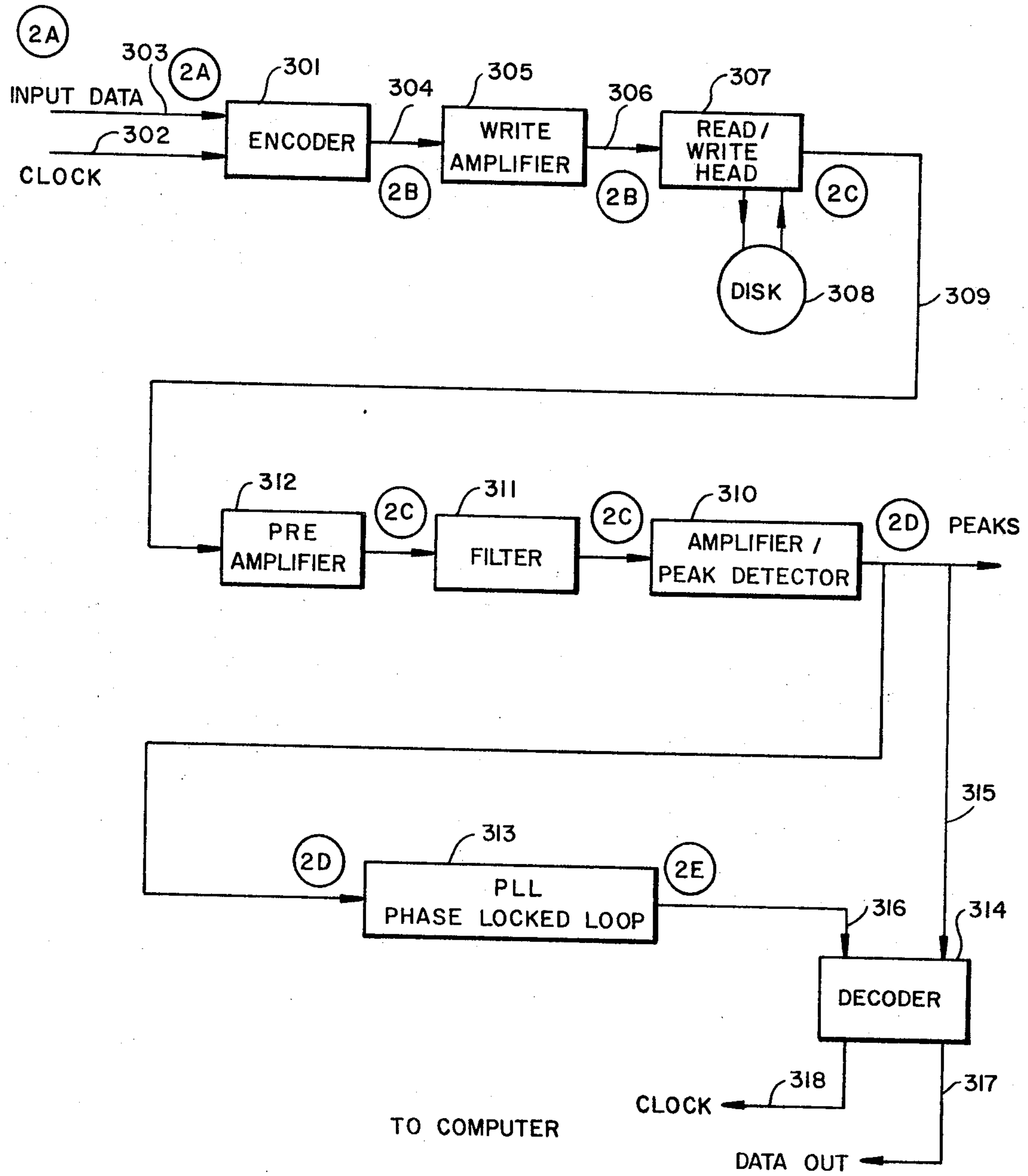
FIG. 1A shows in block diagram form, an encoding and decoding system of the invention.

In the magnetic encoding-decoding system of FIG. 1A, a three frequency encoder (similar to those disclosed in U.S. Pat. Applications of Sollman and Dixon, Ser. Nos. 52,328 and 52,313, both filed on 7-6-7) translates the bits of Non-Return-To-Zero (NRZ)digital signals into three frequency self-clocking signals having a data transition at the center of a binary ONE bit and a data transition between successive binary ZERO bits. Typically NRZ data bits of which FIG. 2A illustrates one example, are introduced into an encoder 301 via input terminal 303 together with clock pulses (not shown) on input terminal 302. The encoder 301 encodes the input of NRZ data into three-frequency-encoded data illustrated graphically on FIG. 2B and is applied via coupling connection 304 to write amplifier 305. The amplified three-frequency-encoded signal 2B is then applied into read/write transducer head 307 by coupling connection 306 for recording the signals onto a magnetic medium such as for example a magnetic disk 308—although a magnetic tape or a magnetic drum would also be a suitable medium. The encoded electric signals are recorded on the magnetic medium as flux transitions in accordance with the desired three frequency code hereinabove mentioned. In three frequency recording herein described for the purposes of the invention, the scheme may use a magnetic flux reversal placed in the center of a bit cell containing a ONE value of binary data and a flux reversal, also recorded on the magnetic medium, between bit cells containing ZERO values of binary data. These flux transitions recorded on the moving magnetic medium 308 when subsequently sensed by the read/write magnetic transducer head 307 produces an output proportionally related to the rate of change of the magnetic flux waveform passing beneath the head 307. An idealized waveform from read/write magnetic transducer head 307 is illustrated on FIG. 2C by READBACK VOLTAGE curve for the particular number configuration coded in three frequency code, from NRZ DATA waveform of FIG. 2A.

The READBACK VOLTAGE signal is applied to a preamplifier 312 for amplifying the signal, and to a filter 311 which filters off extraneous noise. The amplified and filtered READBACK VOLTAGE of FIG. 2C signal is applied to an amplifier/peak detector 310 which further amplifies and converts the peaks into PEAK DETECTOR OUTPUT pulses shown on FIG. 2D. In order that peaks be indicated by pulses, amplifier/peak detector 310 includes a one-shot output circuit (not shown). Peak pulses on FIG. 2D, it will be noted, occur at times when the READBACK VOLTAGE signal shown on FIG. 2C has a maximum or a minimum value. These points coincide with the transition points of WRITE CURRENT waveform shown on FIG. 2B. (The peak pulses are all shown as positive because the negative pulses have been inverted by means well known in the art).

A phase-locked loop 313 produces a train of clock pulses from a voltage controlled oscillator (VCO) contained therein. (Phase-locked-loop techniques are known in the art. Some references are as follows: (a) "Phase Lock Techniques" by Floyd M. Gardner, John Wiley & Sons, 1967; (b) "Monolithic Phase-Locked Signal Conditioner/Demodulator" by Dr. A. B. Grabene, Signetics Corp. 1970. Also, a phase-locked loop as described in U.S. Pat. Application of Agrawala, Dixon and Sollman on "Voltage Controlled Oscillator With Constrained Period of Frequency Change," Ser. No. 81,306 filed Oct. 16, 1970, may be used with this invention.) The phase-locked clock is synchronized to twice the frequency of the highest frequency of the peak pulses. (See FIG. 2E.) The peak pulses, shown on FIG. 2D, are applied to decoder 314 (to be later more fully described) together with PLL OUTPUT waveform of FIG. 2E. The PEAK DETECTOR OUTPUT pulses of FIG. 2D are also applied to the phase-locked loop 313.

Figure 1B:
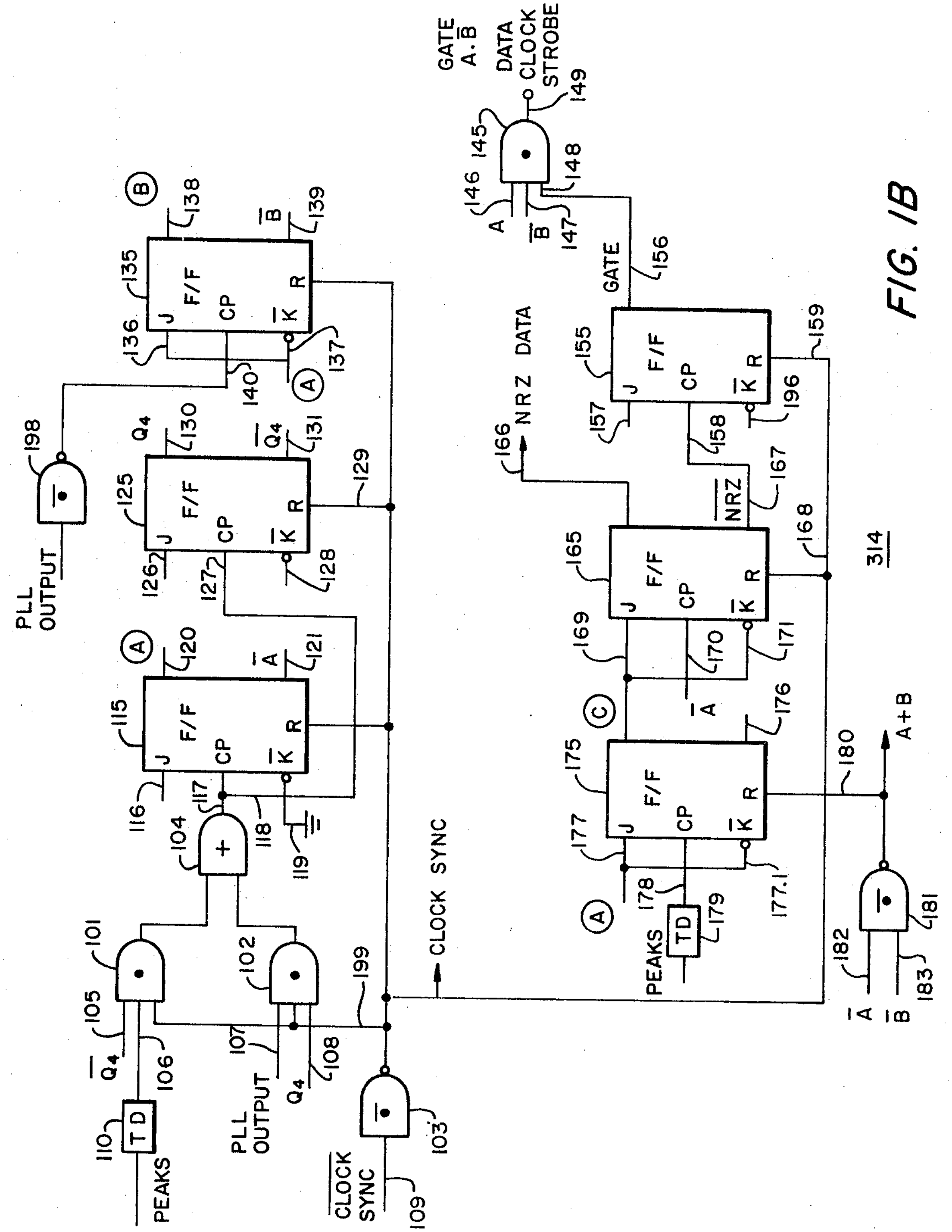
FIG. 1B shows in greater detail, a preferred embodiment of the three frequency data separator or decoder; and, FIG. 2, A through N, are timing diagrams showing a series of waveforms illustrating the relationship of signals in different portions of the decoder system of FIGS. 1A and 1B.

Referring now to FIG. 1B, and to FIGS. 2A–2N, the decoder 314 will be more specifically described.

FIG. 1B shows a more detailed logic block diagram of the decoder. Shown on this figure are trigger flip-flops 115, 125, 135, 155, 165 and 175, which are commercially available from Fairchild Transistor Corp. in California and are of the type termed "Dual JK Edge Trigger Flip-Flop No. 9024." These flip-flops have a reset terminal R for resetting the flip-flops, J and $\bar{K}$ terminals for receiving data, and also a CP terminal for receiving clock pulses. The flip-flops are initially reset. Also the output terminals of the flip-flop generally designated Q and $\bar{Q}$ respectively are herein designated by the letter of the waveform (shown graphically on FIG. 2) which it delivers. For example, on flip-flop 115 the Q and $\bar{Q}$ terminals are designated A and $\bar{A}$; on flip-flop 135 they are designated B and $\bar{B}$; etc. The set input is not shown or utilized in the invention. The J input terminals of flip-flops 115, 125 and 155 are left open, and the $\bar{K}$ input terminals of flip-flops 125 and 155 are also left open; whereas the $\bar{K}$ input terminal of flip-flop 115 is connected to ground 119.

Truth tables for a typical synchronous or asynchronous flip-flop for use with the invention are as follows:

Asynchronous Operation

| Inputs Set | Reset | Outputs Q | $\bar{Q}$ |
|---|---|---|---|
| L | L | H | H |
| L | H | H | L |
| H | L | L | H |
| H | H | Syn Inputs Control | |

Synchronous Operation

| Inputs J | $\bar{K}$ | Outputs Q | $\bar{Q}$ |
|---|---|---|---|
| L | H | No change | |
| L | L | L | H |
| H | H | H | L |
| H | L | Toggle | |

(where L = Low and H = High)

The typical flip-flop has asynchronous input terminals designated set and reset (S, R), which provide the ability to control the state of the flip-flop independent of static conditions of the clock and synchronous inputs. Although both set and reset input terminals may be used, the invention utilizes a type which because of logic trade-off has only reset input terminals. In asynchronous operation the flip-flop changes state independent of the clock pulses, whereas in synchronous operation the flip-flop changes state at clock time. To function synchronously both S, R input terminals should be high. (See truth tables above.) The flip-flop also has internal circuitry such that if any of the input terminals are left open the inputs appear high. This condition is important when J input terminal is left open and $\bar{K}$ input terminal is grounded, then both J and K inputs appear high and the flip-flop will toggle. (See synchronous operation of truth table.)

Referring now to flip-flop 115, the J input terminal of flip-flop 115 is high, $\bar{K}$ input terminal is grounded which means that K input is high. Under this condition, and when reset terminal R is high, the flip-flop will change states at terminal 120, A and $\bar{A}$ respectively, with an application of clock pulse at CP terminal. With flip-flop 125 and flip-flop 155, since both J and $\bar{K}$ terminals are open, these flip-flops will change state from low to high only once during the cycle, at the first application of a clock pulse. Flip-flops 135, and 165 have their J and $\bar{K}$ input terminals connected together and consequently their output signals B and NRZ respectively will follow the signal on J terminal on the application of the next clock pulse. It will also be noted that flip-flop 175 also has its J and $\bar{K}$ input terminals connected together; however its reset terminal is not coupled nor is it responsive to the clock sync signal but to the A + B WAVEFORM signal; and its C output will depend on its reset state, i.e. whether there is A + B pulse thereon, as well as the state of J and $\bar{K}$ input terminals.

Figure 2:
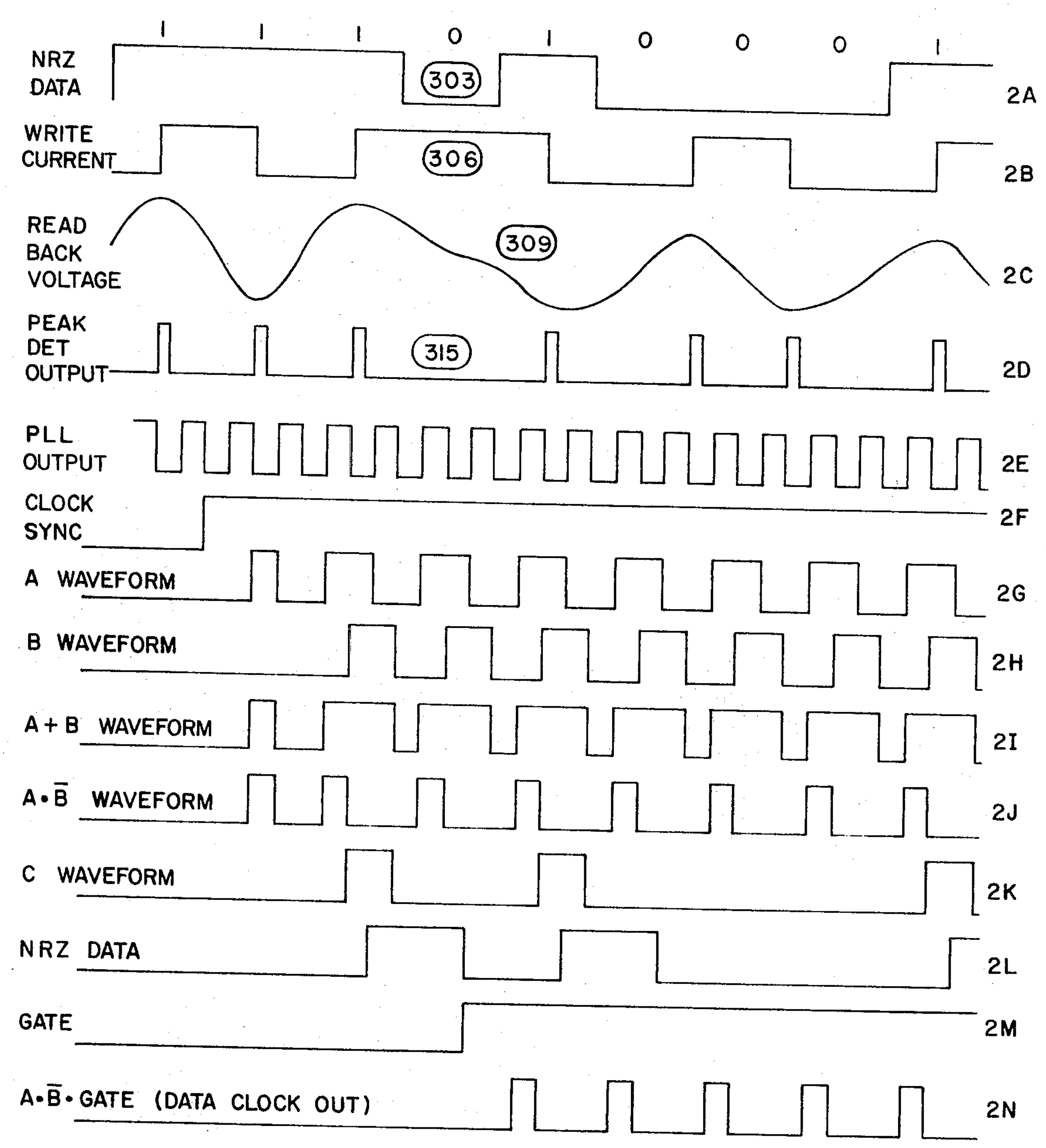

Flip-flop 115 has the output terminal 117 of an OR gate 104 coupled to its CP terminal. OR gate 104 has two inputs one of which is coupled to the output of AND gate 101 and the other, which is coupled to the output of AND gate 102. AND gate 101 has three input terminals 105, 106 and 199; input terminal 105 receives signals $\bar{Q}_4$ from output terminal 131 of flip-flop 125; input 106 receives signals from the PEAK DETECTOR OUTPUT through time delay 110; and input 199 receives clock syn signals. When $\bar{Q}_4$ and clock sync input terminals 105 and 109 respectively are high then gate 101 will let the peak pulses pass through which in turn enables OR gate 104 and applies peak signals to the CP inputs of flip-flops 115 and 125 respectively. AND gate 102 also has three input terminals 107, 108 and 199. Input terminal 107 receives PLL output signals; input terminal 108 receives $Q_4$ signals from output terminal 130 of flip-flop 125; whereas the third input signal which is coupled to line 199 receives clock sync signals. AND gate 102 is enabled to allow PLL pulses to pass through when $\bar{Q}_4$ and clock sync inputs are high, which in turn enables OR gate 104 and permits PLL output pulses to be applied to CP terminals of flip-flops 115 and 125. NAND gate 103 is coupled to the R or reset terminal of flip-flops 115, 125, 135, 155 and 165; and it is also coupled to the input terminals 199 of AND gates 101 and 108. The input terminal of NAND gate 103 receives clock pulses which are complemented at the output; thence when CLOCK SYNC 2F on FIG. 2 is high at the input, it will appear low at the output, and vice versa i.e. when it is low at the input it will appear high at the output.

Flip-flop 115 has its J input terminal 116 open and its $\overline{K}$ input 119 grounded; hence J and K inputs will appear high. It will be noted that flip-flop 115 has its CP input 117 (clock pulse input) coupled to CP input 127 of flip-flop 125. A WAVEFORM, depicted on FIG. 2G appears at the A output 120 of flip-flop 115; and the $\overline{A}$ WAVEFORM appears at the $\overline{A}$ output 121 of flip-flop 115. Flip-flop 125 has its J and $\overline{K}$ inputs 126 and 128 respectively left open; consequently J input appears high and K input appears low. As we have seen previously, this condition together with a high reset R permits the flip-flop to switch on the first clock pulse on CP input terminal 127 and subsequently remains high as long as reset terminal R is high. The output $Q_4$ on output terminal 130 of flip-flop 125 is applied to the input terminal 108 of AND gate 102; the output $\overline{Q}_4$ on output terminal 131 of flip-flop 125 is applied to the input terminal 105 of AND gate 101. Flip-flop 135 has its J and $\overline{K}$ inputs tied together, while its CP input 140 is coupled to the output of NAND gate 198. Since PLL OUTPUT pulses are applied to the input of NAND gate 198 the flip-flop is switched by these pulses depending on the J($J = \overline{K} = A$) and R state. When flip-flop 135 is reset, i.e. the B output is low, and A output signal is high, then B WAVEFORM on output terminal 138 will go high on the next $\overline{PLL}$ pulse. It will be seen therefore that B signal follows A signal but it is delayed by a quarter of a bit time.

Flip-flop 175 also has its J and $\overline{K}$ inputs 177 and 177.1 respectively tied together; peak pulses are applied from Peak Detector output through time delay 179, onto the CP input terminal 178; however it will be noted that the reset R is now tied to the output terminal of NAND gate 181 on whose input terminals 182 and 183 respectively the $\overline{A}$, $\overline{B}$ signals are applied. Since $\overline{\overline{A} \cdot \overline{B}} = A + B$, by De Morgan's Theorem, we have the logical addition of A or B signals being applied to the reset terminal R of flip-flop 175. The C output of flip-flop 175 is coupled to the J input terminal 169 of flip-flop 165. J and $\overline{K}$ inputs 169 and 171 respectively, of flip-flop 165 are tied together, and $\overline{A}$ signal is applied to the CP input 170 of flip-flop 165. NRZ DATA goes high on the next $\overline{A}$ pulse when reset R is high, and C WAVEFORM applied to J and $\overline{K}$ of flip-flop 165 is high; conversely NRZ DATA goes low on the succeeding $\overline{A}$ pulse when reset R of flip-flop 165 is still high, but C applied on J and $\overline{K}$ inputs is low. The $\overline{NRZ}$ DATA output 167 of flip-flop 165, is coupled to the CP input 158 of flip-flop 155; as previously noted J and $\overline{K}$ input terminals are open whereas GATE output terminal 156 is coupled into the input of AND gate 145. AND gate 145 also has two other inputs for introducing A $\overline{B}$ WAVEFORM signals. AND gate 145 as previously noted is enabled when 148 is high and it lets the $A \cdot \overline{B}$ pulses to go through.

DESCRIPTION OF THE OPERATION

With reference to FIGS. 1B and 2, the operation of the three frequency decoder will now be described. Referring to FIG. 1B the PEAK DETECTOR output of FIG. 2D is applied to the decoder 314 through a time delay 110. If the time delay at input terminal 106 is ZERO, then the signal appearing at 106 will be the same as the signal appearing on input terminal 315 of the decoder 314. (FIG. 1A.) For this embodiment, we have assumed that the time delay required is ZERO and consequently the signal at input terminal 106 of the AND gate 101 is the same as the signal on the input terminal 315 of the decoder 314. The relationship between the PLL pulses of FIG. 2E, appearing on input terminal 107 of AND gate 102 and the peak pulses from PEAK DETECTOR output appearing at input terminal 106 of AND gate 101 is set via the time delay such that the leading edges of the PEAK DETECTOR output pulses correspond to the trailing edges of the phase-locked loop output. (See FIG. 2D and 2E.) AND gate 102 is enabled when coincident high signals appear at input terminals 107, 108 and 199. Thus PLL signal appears at the output terminal of gate 102.

When $\overline{\text{CLOCK SYNC}}$ pulse is low on input terminal 109 of NAND gate 103, then the output CLOCK SYNC pulse shown on FIG. 2F of NAND gate 103 is high. (The CLOCK SYNC is derived from the preamble which is initially recorded. The preamble is used for initial synchronization wherein all ONES are read from the recording medium and since in three frequency code the ONES appear in the middle of the cell, this information is used to synchronize the phase-locked loop. This synchronization technique uses basically a one-shot or a time delay circuit to give the number of ONES needed for synchronization. The phase-locked loop will lock on to the input after a certain number of input pulses. A time delay circuit which generates a signal after a predetermined number of pulses have gone into the phase-locked loop input will be a clock sync signal. The predetermined number is selected to be greater than that needed for the phase-locked loop to lock on. The time delay can be achieved by using a counter or any other time measurement technique. A simple technique to use is two one shots.) (Ref. Fairchild Semiconductor Integrated Circuit Catalog 1970, pages 3–112.)

Initially before the appearance of a CLOCK SYNC pulse both flip-flops 115 and 125 have their A, and $Q_4$ outputs low, while their $\overline{A}$ and $\overline{Q}_4$ outputs are high, (a high output for the purposes of this invention means a voltage output usually 6 volts, above ground). Since $\overline{Q}_4$ is high, the appearance of a first pulse from the PEAK DETECTOR output on input terminal 106 of AND gate 101 will enable AND gate 101 (all other inputs being high) and will appear on an input terminal of OR gate 104; subsequently the peak pulse will appear on input terminal 117 of flip-flop 115, and also on input terminal 127 of flip-flop 125. The peak pulse will in turn make A terminal 120 go high and $\overline{A}$ at terminal 121 go low and will also make $Q_4$ at terminal 130 go high and $\overline{Q}_4$ at terminal 131 go low and $\overline{Q}_4$ will remain in this condition for the remainder of the reading cycle. Therefore, no further peak pulses can pass through AND gate 101 while this condition obtains (for $\overline{Q}_4$ will be low), A and $Q_4$ is high, pulses from the phase-locked loop output (PLL) will enable gate 102 and be applied to OR gate 104 and subsequently into flip-flops 115 via input terminal 117. Because flip-flop 115 is connected so that the input terminal 116 is high and input terminal 119 is low, whereas flip-flop 125 is connected so that the input terminal 126 is high and the input terminal 128 is high positive pulses appearing on CP input terminal 117 will cause flip-flop 115 to change state, whereas the same positive pulses appearing on CP input terminal 127 of flip-flop 125 will not cause flip-flop 125 to change state and it will remain in one fixed state (see truth table)—that is $Q_4$ will be high and $\overline{Q}_4$ will be low. The output A of flip-flop 115 appearing on terminal 120 is the "window" which is set in the middle of the cell. (See A WAVEFORM on FIG. 2G). This window is checked by means hereinafter described to determine if there is a phase reversal in the middle of the bit cell, and if there is to generate appropriate binary coded signals.

Flip-flop 135 has its J input terminal 136 tied to its $\overline{K}$ terminal input 137; its CP input terminal 140 is coupled to the output terminal of NAND gate 198. A PLL output signal is applied to the CP input terminal 140 via gate 198 and A WAVEFORM (FIG. 2G) is applied via J and $\overline{K}$ input terminals 136 and 137 which are coupled together. Basically, this flip-flop 135 is connected as a shift register whereby data is applied at inputs J and $\overline{K}$ and is delivered at one of the outputs of flip-flop 135, whenever a trailing edge of the PLL loop occurs at input of gate 198. FIG. 2H shows the B WAVEFORM signal appearing at the output terminal 138; it will be observed that it is the same as A WAVEFORM (FIG. 2G), delayed by a quarter of a bit time.

The output signal A of flip-flop 115 is applied to the input terminal of AND 145 whereas the output signal $\overline{B}$ of flip-flop 135 is also applied to the input terminal of AND gate 145, and the output terminal 156 of flip-flop 155 is also coupled to the input terminal of AND gate 145. Furthermore, it will be seen that the $\overline{A}$ output signal of flip-flop 115 and the $\overline{B}$ output signal of flip-flop 135 are applied to the input of NAND gate 181. Therefore, when $\overline{A}\cdot\overline{B}$ are high the A + B WAVEFORM FIG. 21 is established—from Boolean algebra and De Morgan's theorem ($\overline{\overline{A}\cdot\overline{B}} = A + B$). Therefore, A + B WAVEFORM (FIG. 21) is the logical addition of A WAVEFORM signal and B WAVEFORM signal. Similarly $A\cdot\overline{B}$ WAVEFORM (FIG. 2J) is the logical multiplication of A and B WAVEFORM. This logical multiplication results in the data clock, and is strobed to the output terminal 149 of AND gate 145, when output 156 (Gate output) of flip-flop 155 is high.

The A + B WAVEFORM signal is applied to the clear (reset terminal) of flip-flop 175 by a connection 180. Since the J and $\overline{K}$, 177 and 177.1 inputs of flip-flop 175 are coupled together and since the A WAVEFORM signal is applied to these terminals, C output of flip-flop 175 will go high when A is high and a peak pulse from PEAK DETECTOR output appears at CP terminal 178 of flip-flop 175 via the time delay 179. (C WAVEFORM is shown on FIG. 2K). The WAVEFORM signal is used to generate the NRZ DATA into the output 166 of flip-flop 165 as follows:

Since the C WAVEFORM output signal of flip-flop 175 is applied to the J and $\overline{K}$ inputs 169 and 171 of flip-flop 165, and since $\overline{A}$ signal is applied to the CP input terminal 170 of flip-flop 165 then terminal 166 will go high if C was high, as $\overline{A}$ went from low to high; and terminal 166 will go low if C was low as $\overline{A}$ went from low to high. Note that reset input of flip-flop 175 is an A + B WAVEFORM signal, whereas on all the rest of the flip-flops the reset input is the same as the CLOCK SYNC. The output terminal 156 of flip-flop 155 will go high the first time that NRZ DATA changes from a 1 to a 0 or in other words the $\overline{NRZ}$ coupled to the CP input terminal 158 of flip-flop 155 goes from a 0 to a 1. The Gate output 156 of flip-flop 155 (see FIG. 2M) being coupled to the input of AND gate 145 enables this gate when it is high; thus delivering the data clock ($A\cdot\overline{B}$ WAVEFORM) FIG. 2J together with the NRZ DATA FIG. 2L, which appears on output 166.

While in accordance with the provisions in the statutes, there has been illustrated and described the best mode of the invention known, certain changes may be made in the circuits described without departing from the spirit of the invention as set forth and the appended claims and that in some cases, certain features of the invention may be used to advantage without a corresponding use of other features.

Having described the invention, what is claimed new and novel for which it is desired to secure Letters Patent is:

1. In combination with a binary magnetic recording recovery device including a moving magnetic medium having recorded thereon flux orientations indicative of binary coded data, transducer means responsive to changes in the flux orientation of said moving magnetic medium for producing a read signal, peak detector means responsive to the maxima of the read signal for generating peak pulses, and phase-locked loop (PLL) means for generating a periodic frequency output having a prescribed phase relationship relative to the phase of the peak pulses, a decoder for decoding a self-clocking input information signal wherein a transition occurs in the middle of a bit cell representing a "1" and a transition occurs between bit cells representing two successive "0's" comprising:
   a. first means for generating a "window" in the middle of a bit cell;
   b. second means responsive to said "window" for generating an output signal when there is a phase reversal in said "window" and no output signal when there is no phase reversal;
   c. and third means responsive to the output signal of said second means for generating a binary coded signal containing the three frequency encoded information of the input signal.

2. A decoder as recited in claim 1 wherein said third means is responsive to said second means to generate a binary coded signal which is a Non-Return-To-Zero (NRZ) signal containing the three frequency encoded information of the input signal.

3. A decoder as recited in claim 2 including fourth means for generating clock pulses for clocking the Non-Return-To-Zero signal.

4. A decoder as recited in claim 1 including synchronizing means for synchronizing the phase of the PLL output signal in a prescribed manner with that of an input peak pulse signal.

5. A three frequency decoder for decoding a self-clocking input information signal wherein a transition occurs in the middle of a bit cell representing a "1" and a transition occurs between bit cells representing two successive "0's" comprising:
   a. first means for generating a "window" signal in the middle of a bit cell;
   b. second means responsive to said first means for generating an output signal when there is a phase reversal in said "window" signal and no output signal when there is no phase reversal;
   c. and third means responsive to the output signal of said second means for generating a binary coded signal containing the three frequency encoded information of the input signal.

6. A three frequency decoder as recited in claim 5 further comprising phase-locked loop (PLL) means for generating a periodic frequency signal which has a frequency of twice the data signal frequency, and also further comprising peak pulse generating means responsive to the maxima of a read signal for generating peak pulse signals.

7. A three frequency decoder as recited in claim 6 further comprising synchronizing means responsive to preamble binary signals for synchronizing in a prescribed manner the phase of the PLL output signals with that of the peak pulse signals.

8. A three frequency decoder as recited in claim 7 wherein the phase of the PLL output signal is synchronized with that of the peak pulse signal such that a leading edge of the peak pulse signal coincides in time with a trailing edge of a PLL signal.

9. A three frequency decoder as recited in claim 5 wherein said first, second and third means comprise synchronous/asynchronous flip-flops having set, reset (S, R) J and $\overline{K}$ input terminals and Q and $\overline{Q}$ output terminals and clock pulse (CP) terminal and having the following truth tables:

Truth Table for Asynchronous Operation

| Set(s) | Reset(R) | Q output | $\overline{Q}$ output |
|---|---|---|---|
| L | L | H | H |
| L | H | H | L |
| H | L | L | H |
| H | H | Sync Inputs Control | |

Truth Table for Synchronous Operation

| J | $\overline{K}$ | Q | $\overline{Q}$ |
|---|---|---|---|
| L | H | No change | |
| L | L | L | H |
| H | H | H | L |
| H | L | Toggle | |

where L = Low and H = High

10. A three frequency decoder as recited in claim 5 including fourth means for generating clock pulses for clocking relative to the bit cell the binary coded signal containing the three frequency encoded information of the input signal.

11. A method of decoding a self-clocking input information signal wherein a transition occurs in the middle of a bit cell representing a "1" and a transition occurs between bit cells representing two successive "0's" comprising the steps of:
   a. generating a "window" signal in the middle of a bit cell;
   b. checking the "window" signal to determine the presence or absence of a phase reversal in the "window";
   c. generating a pulse signal if there is a phase reversal in the middle of the bit cell;

d. and generating, in response to said pulse signal, a Non-Return-ToaZero (NRZ) binary coded signal.

12. A method of decoding a self-clocking input information signal as recited in claim 11 further comprising the step of generating clock pulse signals for clocking the NRZ signal.

13. A method of decoding a self-clocking input information signal as recited in claim 12 further comprising the step of generating a peak pulse signal in response to the maximum of a read signal.

14. A method of decoding a self-clocking input information signal as recited in claim 13 further comprising the step of generating a phase-locked loop (PLL) signal which has a frequency that is twice the frequency of the data signal.

15. A method of decoding a self-clocking input information signal as recited in claim 14 further comprising the step of generating a preamble binary signal for synchronizing in a prescribed manner the phase of the PLL signal with that of the peak pulse signal.

16. A method of decoding a self-clocking input information signal as recited in claim 15 wherein the phase of the PLL signal is synchronized with that of the peak pulse signal such that a leading edge of the peak pulse signal coincides in time with a trailing edge of a PLL signal and wherein the trailing edge of the PLL signal appears in the middle of the "window."

* * * * *